Figure 1:
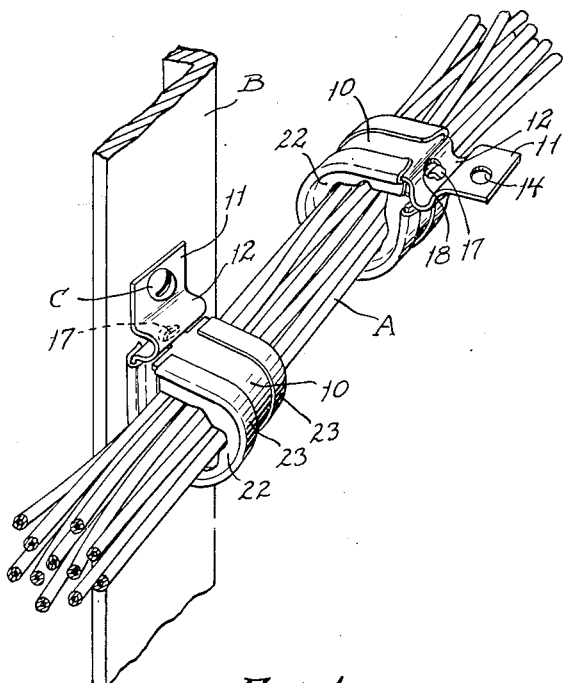

Feb. 1, 1944.         G. A. TINNERMAN         2,340,712
SNAP CLAMP
Filed Nov. 3, 1942

INVENTOR.
George A. Tinnerman,
BY
Bates, Teare & McBean,
Attorneys.

Patented Feb. 1, 1944

2,340,712

UNITED STATES PATENT OFFICE 2,340,712

SNAP CLAMP

George A. Tinnerman, Cleveland, Ohio, assignor to Tinnerman Products, Inc., Cleveland, Ohio Application November 3, 1942, Serial No. 464,338

6 Claims. (Cl. 248—74)

This invention relates to a clamp of the type which is adapted to surround an object, for instance, an assembly of wires, and be attached to a support. My clamp is preferably a normally open U-shaped spring member, the intermediate body portion of which may embrace the article to be retained, while one of the end portions is adapted to have a snap engagement to the other end portion to clamp the object. One of the end portions is adapted to be attached firmly to a support without interfering with the opening or closing action of the clamp.

The above-mentioned characteristic of a clamp to be fixedly attached to its support and still be adapted to be opened and closed without disturbing the attachment is a feature of my invention.

My invention is especially well adapted for airplane work, enabling the immediate mounting of a clamp on a group of wires and the attachment of the clamp to a support, and after attachment enabling the immediate opening and subsequent closing of the clamp without disturbing the mounting. This provides for a quick change of a damaged wire and is especially valuable in airplane installations.

An approved embodiment of my invention is illustrated in the drawing hereof and is hereinafter more fully described.

Figure 2:
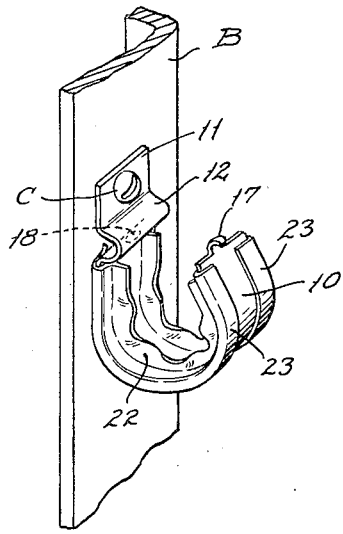
Figure 3:
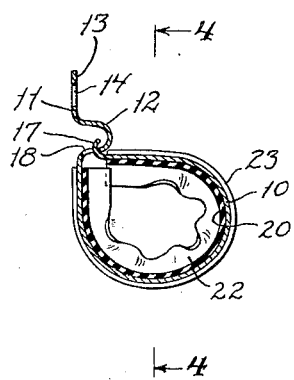
Figure 4:
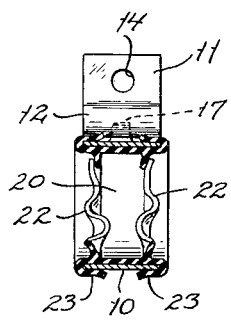

In the drawing, Fig. 1 is a perspective showing two of my clamps about a bundle of wires, one of the clamps being attached to a support and the other one closed about the wires. The position of the latter being selected to disclose the rear face of the clamp; Fig. 2 is a perspective showing the clamp attached to a supoprt and open ready for the reception of the object; Fig. 3 is a view illustrating in section the clamp in closed position; Fig. 4 is a cross section of the clamp, as indicated by the line 4—4 on Fig. 3.

As shown, the body of my clamp comprises a strap 10 of spring sheet metal, preferably straight in its lateral cross section, and looped into U-shape. The body portion preferably carries a yielding lining 20 which assists in tightly holding the object clamped. The two end portions of the loop beyond the lining are specially formed to interlock with each other, and to provide for the attachment of the clamp to a support, as about to be explained.

One end of the body terminates in an arm designated 11, which is bowed forwardly and then rearwardly to provide a rearwardly open trough-like or U-shaped portion 12, the arm then continuing as a flat portion 13 approximately aligned with the portion of the body on the other side of the trough. An opening 14 through the flat extension provides for the passage of a screw to attach the clamp fixedly to a support. This is indicated in Figs. 1 and 2, where A indicates the object clamped, B the support and C the attaching screw.

The free end of the loop 10 is formed in a central region with a projecting outwardly facing hook 17 made by bending outwardly and curving backwardly over the loop a central integral portion of the body. The underside of the U-shaped portion 12 of the arm 10 is formed with an opening 18 into which the hook may extend, thus holding the clamp closed.

When the clamp is placed about the object a closing pressure on the free end of the U-shaped body causes the hook 17 to engage the outer surface of the U-shaped portion 12 and then slide under such U-shaped portion until the hook registers with the hole 18, whereupon the resilience of the body causes the hook to snap into such hole and firmly retain the clamp closed for use. The clamp may be readily released, however, whenever necessary by a pressure on the free end portion of the body in a direction which is rearward and toward the object embraced. This unhooks the hook 18 from the U-shaped portion of the arm 11 and opens the clamp.

As heretofore stated, the clamp is preferably provided with the yielding lining to enable it to grasp more effectively objects of varying sizes. As shown, this lining, which is made of soft rubber or similar material, comprises a band 20 lying on the inner surface of the loop and suitably held thereon and having a plurality of inwardly projecting puckered webs 22, which are adapted to bear against the exterior of the object carried, throughout a considerable range in size of such object. As shown in the drawing, the band is held in place by forming the marginal portions thereof so that they bend backwardly as shown at 23, and thus lie on the exterior of the metal loop and hold the rubber member in place. The particular lining shown, however, is not claimed herein but in another application of mine.

It will be seen that my clamp is adapted to be placed instantly about a bundle of wires, as illustrated in Fig. 1, and when so placed may hold itself closed by reason of its snapping action before the clamp is mounted. This is of advantage in airplane work as it enables a long bundle of wires to be effectively held together in advance of the mounting but ready for immediate mounting merely by the insertion of the supporting screws. After the clamps have been mounted on the support they effectively hold the embraced wires in position, while any clamp may be instantly opened to enable the removal and the replacement of a wire.

I claim:

1. A clamp comprising a loop, one end portion of the loop having an intermediately located forwardly extending return bend with an opening in it and an extension beyond said return bend formed for attachment to a support, there being a projection on the other end of the loop adapted to occupy such opening.

2. A clamp comprising a loop of spring material, one end portion of the loop having a forwardly extending U-shaped part with an opening in the lower portion thereof, there being an upwardly extending projection on the other end of the loop adapted to occupy such opening.

3. A clamp comprising a U-shaped strip of spring material, one end portion of the loop being bent forwardly and then backwardly to provide an intermediately located U-shaped portion and a substantially flat extension beyond the same, there being an opening through the extension and an opening through the underside of the U-shaped portion, the other end of the loop having at its end an upwardly facing hook adapted when the clamp is being closed to slide on the under face of the U-shaped portion and snap into the opening therein, whereby the clamp may be closed and opened independently of a member passing through the opening in said extension for securing the clamp on its support.

4. A clamp comprising a loop of spring material, one end portion of the loop having an intermediately located forwardly projecting return bend and an extension beyond said return bend formed for attachment to a support, said forwardly projecting return bend and the free end of the loop being provided with shoulders adapted to interlock to hold the loop closed by spring action.

5. A clamp comprising a loop of spring material, one end portion of the loop being bent forwardly and backwardly and then outwardly to provide an intermediately located return bend, the outward extension providing means whereby the device may be secured to a support, said return bend and the free end of the loop being provided respectively with shoulders adapted to be inter-engaged by snap action to hold the loop closed.

6. A clamp comprising a loop of spring material, one end portion of the loop having an opening for the passage of a screw adapted to attach it fixedly to a support, the material between the opening and the body of the loop being formed into a forwardly extending return bend, one of the reaches of the return bend being provided with an opening, and the other end of the loop having a projection adapted to occupy said opening to hold the loop closed.

GEORGE A. TINNERMAN.